Patented May 23, 1950

2,508,745

UNITED STATES PATENT OFFICE 2,508,745

HYDROCARBON ESTERS OF HYDROCARBONYLTHIOLSULFINIC ACIDS AND THEIR PROCESS OF PREPARATION

Chester J. Cavallito and La Verne D. Small, Albany, N. Y., assignors to Sterling Drug Inc., Wilmington, Del., a corporation of Delaware No Drawing. Application December 18, 1946, Serial No. 717,080

10 Claims. (Cl. 260—453)

This invention relates to organic thiolsulfinates and to a method for the preparation thereof.

This application is a continuation-in-part of U. S. application Ser. No. 552,007, filed August 30, 1944, wherein there is disclosed a method for obtaining from *Allium sativum*, the common garlic, an antibiotic compound, allyl disulfide oxide, having the structure

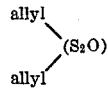

Preliminary data indicated that allyl disulfide oxide is a member of a new class of organic compounds having the functional grouping

and that it has the structure

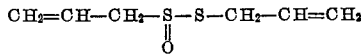

Although compounds of this type have been postulated as existing as intermediate products in the well-known oxidation of disulfides to yield thiolsulfonates, previous investigators have found that even cautious oxidation of the disulfides yielded no products corresponding to the postulated oxidation stage (Gilman, Organic Chemistry, second edition, vol. I, p. 907). In the course of experiments directed toward the synthesis of members of this new class of compounds, which we have designated as thiolsulfinates, we have synthesized allyl 2-propene-1-thiolsulfinate and have proved its identity with the antibiotic substance, allyl disulfide oxide, obtained from garlic cloves. Further, we have discovered a general method whereby organic thiolsulfinates can be obtained in good yield. Our invention comprises treating an organic disulfide with an organic per-acid, preferably in the presence of a solvent, at a temperature below 55° C., whereby there is produced an organic thiolsulfinate. This oxidation reaction can be expressed by the following equation:

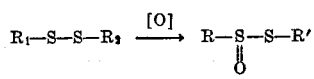

wherein $R_1$, $R_2$, $R$, and $R'$ each represent organic radicals, and wherein each of the sulfur atoms is attached to a carbon atom of the organic radical. In those instances where the radicals $R_1$ and $R_2$ contain no groups susceptible to oxidation by organic per-acids, $R_1$ and $R_2$ are identical, respectively, with the radicals $R$ and $R'$.

The organic disulfides which are employed as the starting materials in the process of our invention can be of the most varied type where $R_1$ and $R_2$ can each be either aliphatic-type or aromatic-type radicals or where $R_1$ and $R_2$ taken together constitute a bivalent radical such as alkylene. By the terms "aliphatic-type" and "aromatic-type" radicals, we mean to include: (a) alkyl radicals, for example, methyl, ethyl, n-propyl, isopropyl, n-butyl, sec-butyl, n-amyl, etc., (b) alkenyl radicals, for example, allyl, methallyl, etc., (c) aralkyl radicals, for example, benzyl, phenethyl, etc., (d) alicyclic radicals, for example, cyclohexyl, cyclopentyl, cyclohexenyl, etc., (e) saturated heteryl radicals, for example, piperidyl, morpholinyl, tetrahydropyranyl, etc., and (f) aromatic-type heteryl radicals such as pyridyl, thiazyl, furyl, thienyl, pyrimidyl, quinolyl, etc. which have a conjugated system of double bonds, and (g) aryl radicals, for example, phenyl, naphthyl, etc.

The afore-mentioned radicals can be unsubstituted or can bear one or more functional groups such as hydroxyl, carbonyl, halogen, carboxyl, amino, cyano, ether, etc.

Under the oxidation conditions employed in our process, mercaptans are converted to disulfides which in turn are converted, in the presence of a sufficient quantity of the organic per-acid, to thiolsulfinates. Although this procedure may offer some advantages in specific instances, we have found that, in general, better yields of the desired thiolsulfinates are obtained by the direct use of the appropriate disulfide as the starting material than by the use of a procedure involving intermediate formation of the disulfide in the reaction mixture.

As the organic per-acid which is employed as the oxidizing agent in our process, there can be used, for example, perbenzoic acid, perphthalic acid, perfuroic acid, percamphoric acid, peracetic acid, etc. For reasons of economy and ease of availability, we prefer to use perbenzoic acid or perphthalic acid. In some instances the use of a particular per-acid will be found to afford a somewhat better yield of thiolsulfinate than that obtained by using another per-acid, e. g. in converting isopropyl disulfide to isopropyl 2-propanethiolsulfinate, peracetic acid is preferable to perbenzoic acid. We have found that in order to obtain a satisfactory yield of the thiolsulfinate, the molecular ratio of oxidizing agent, i. e. organic per-acid to disulfide, should be within the range 0.5–2.0, the optimum ratio being about 1. It is understood, of course, that if the starting material contains one or more functional groups other than the disulfide group which are susceptible to oxidation by organic per-acids, an additional quantity of the per-acid will be required for the reaction.

The oxidation process can be carried out by employing an excess of the disulfide to serve as a solvent, but it is more satisfactory and more convenient to use an added solvent. The choice of this solvent is not a critical one, since a wide variety of organic liquids can be employed without significant effect on the yield of thiolsulfinate, for example: halogenated hydrocarbons, alcohols, lower fatty acids, nitriles, ketones, esters, etc. This group includes, for example, benzene, petroleum ether, chloroform, methylene chloride, carbon tetrachloride, ethyl alcohol, t-butyl alcohol, acetic acid, acetonitrile, acetone, and ethyl acetate.

The reaction should be conducted at a temperature below 55° C., since the yield of thiolsulfinate drops off markedly above this point. We prefer to conduct the reaction, for the purpose of convenience, at about 10-35° C., but satisfactory yields are also obtained at much lower temperatures, for example, at −20° C.

The oxidation process generally proceeds quickly, the reaction time being about 15–30 minutes, and the yield is not altered significantly by extending the period of contact of the reactants to three hours. However, in some instances, as in the conversion of bis(secondary alkyl) disulfides to thiolsulfinates, e. g. preparation of isopropyl 2-propanethiolsulfinate from isopropyl disulfide, steric hindrance is apparently an important factor and we have found that it is advantageous to irradiate the reaction mixture with ultraviolet light in order to facilitate reaction in such instances. This effect of steric hindrance is even more pronounced in the case of bis(tertiary alkyl) disulfides, for example, tertiary hexyl disulfide and tertiary butyl disulfide.

Isolation of the thiolsulfinates obtained by our process is carried out by the usual procedures of fractional distillation at reduced pressure, partition between solvents, or fractional crystallization. It is desirable to employ an isolation procedure which does not require use of temperatures above 55° C., since in this way loss of product through thermal decompositoin of the thiolsulfinates is avoided. In the case of alkyl alkanethiolsulfinates, for example, we prefer to employ fractional distillation at reduced pressure of the reaction mixture preceded by an alkali wash to remove traces of unused oxidant and acidic by-products of the reaction. The first fractions of the distillate consist of the organic solvent together with some unchanged disulfide starting material. Subsequently the desired thiolsulfinate fraction distills, leaving as the distillation residue a small amount of relatively non-volatile impurities, consisting chiefly of higher oxidation products such as thiolsulfonates and disulfones, which are present in the reaction mixture.

The chemical properties of the thiolsulfinates obtained by our process vary considerably, of course, depending on the nature of the radicals attached to the

linkage. Thiolsulfinates are converted by oxidation to thiolsulfonates, and by reduction to mercaptans and disulfides. Under hydrolytic conditions, thiolsulfinates are transformed to disulfides and sulfur dioxide is produced. As a class, the thiolsulfinates are relatively stable compounds which require no special precautions for their preservation when stored for several weeks at room temperature, although temperatures above 55° C. cause serious decomposition. The compound allyl 2-propene-1-thiolsulfinate is exceptionally sensitive, however, exhibiting a great tendency to polymerize, at the same time losing its antibiotic activity, and thus must be stored at low temperature.

The alkyl alkanethiolsulfinates having 2–12 carbon atoms are liquids, being colorless or slightly yellow oils, which have a sharp odor. These compounds are more soluble in water than are the corresponding disulfides, the members of the series exhibiting decreasing water solubility as the number of carbon atoms increases, the higher members being practically insoluble. These compounds react with cysteine to form solid condensation products in accordance with the following equation:

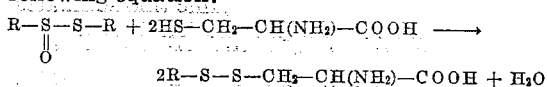

The organic thiolsulfinates are active anti-bacterial and fungicidal agents which are effective against both Gram-negative and Gram-positive organisms. This property is inherent in the

group, the compounds being inactivated by any reagent which destroys this functional group. The antibiotic activity exhibited toward various groups of organisms varies with the type of radicals attached to the

group. Thus, in the alkyl alkanethiolsulfinate series, butyl 1-butanethiolsulfinate is more effective than ethyl ethanethiolsulfinate against Gram-positive organisms such as *Staph. aureus, Staphy. albus, Sarcina lutea, Strep. hemolyticus, B. subtilis,* and *B. cereus,* while ethyl ethanethiolsulfinate is the more effective of the two compounds against Gram-negative organisms such as *B. coli, B. dysenteriae* Flexner, and *B. typhi murium.*

Our invention is illustrated by the following examples without, however, being limited thereto.

EXAMPLE 1

*Allyl 2-propene-1-thiolsulfinate*

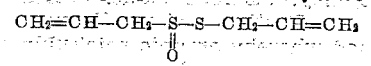

5.2 g. of allyl disulfide is dissolved in 1000 ml. of chloroform and the solution is cooled in an ice bath. To the chilled solution there is slowly added with stirring a solution of 4.8 g. of perbenzoic acid in 100 ml. of chloroform. The reaction mixture is allowed to stand for about an hour at room temperature and is then washed successively with two 250 ml. portions of a 1.0% aqueous solution of sodium bicarbonate and a 150 ml. portion of water. The chloroform is then distilled from the chloroform solution at about 30–40 mm. pressure and the distillation residue is treated with 15 ml. of petroleum ether. This mixture is extracted with six 200 ml. portions of water. The aqueous extracts are combined and extracted with four 50 ml. portions of chloroform. The chloroform is distilled from the combined chloroform extracts at about 30–40 mm. pressure.

The distillation residue, which is a yellow oil consisting of allyl 2-propene-1-thiolsulfinate, weight 3.15 g. The pure compound has a $d_4^{20}$ of 1.112 and $n_D^{20}$ 1.562. Analysis calcd. for $C_6H_{10}OS_2$: C, 44.44%; H, 6.17%. Found for synthetic allyl 2-propene-1-thiolsulfinate: C, 44.82%; H, 6.24%. Physical data and range of analytical values found for allyl 2-propene-1-thiolsulfinate obtained from *Allium sativum*: C, 44.12% to 44.59%; H, 6.30% to 6.34%; $d_4^{20}$ 1.112 and $n_D^{20}$ 1.561.

The synthetic allyl 2-propene-1-thiolsulfinate reacts with 1-cysteine hydrochloride to yield a solid condensation product melting at approximately 185° C. (dec.). There is no depression of the melting point when a sample of this condensation product is mixed with the condensation product, M. P. 185° C. (dec.), produced by the interaction of 1-cysteine hydrochloride and allyl 2-propene-1-thiolsulfinate obtained from *Allium sativum*.

EXAMPLE 2

*Methyl methanethiolsulfinate*

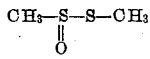

4.9 g. of methyl disulfide is dissolved in about 300 ml. of carbon tetrachloride and the solution is cooled in an ice bath. To the chilled solution there is slowly added with stirring a solution of 10.2 g. of perphthalic acid in 300 ml. of carbon tetrachloride. The reaction mixture is allowed to stand for about an hour at room temperature and is then washed with two 100 ml. portions of a 4% aqueous solution of sodium bicarbonate followed by a 50 ml. portion of water. The carbon tetrachloride is then distilled from the carbon tetrachloride solution at about 30–40 mm. pressure and the distillation residue is subjected to fractional distillation at low pressure. The fraction which distills from the mixture at 48° C. at 0.3–0.5 mm. pressure consists of methyl methanethiolsulfinate. The yield is 1.15 g. The pure compound has a $d_4^{25}$ of 1.222 and $n_D^{25}$ 1.548. It is very soluble in water. Analysis calcd. for $C_2H_6OS_2$: C, 21.80%; H, 5.49%. Found: C, 22.06%; H, 5.78%.

EXAMPLE 3

*Ethyl ethanethiolsulfinate*

$$C_2H_5\!-\!\underset{\underset{O}{\|}}{S}\!-\!S\!-\!C_2H_5$$

12.2 g. of ethyl disulfide is dissolved in 300 ml. of tertiary butyl alcohol and to this solution there is added with stirring during a period of about 5–10 minutes a solution of 12.8 g. of perfuoric acid in 500 ml. of tertiary butyl alcohol. The reaction mixture is allowed to stand for about an hour at room temperature and the tertiary butyl alcohol is then distilled from the solution at about 20 mm. pressure. The distillation residue is dissolved in chloroform and this solution is washed successively with a 150 ml. portion of 6% aqueous sodium bicarbonate solution and then with a 50 ml. portion of water. The chloroform is distilled from the chloroform solution at about 30–40 mm. pressure and the residue is subjected to fractional distillation at low pressure. The fraction which distills from the mixture at 52° C. at 0.2–0.3 mm. pressure is ethyl ethanethiolsulfinate. The yield is 6.2 g. The pure compound has a $d_4^{25}$ of 1.104 and $n_D^{25}$ 1.524. It is soluble in water to the extent of about 10%. Analysis calcd. for $C_4H_{10}OS_2$: C, 34.75%; H, 7.29%. Found: C, 35.06%; H, 7.46%.

EXAMPLE 4

*n-Propyl 1-propanethiolsulfinate*

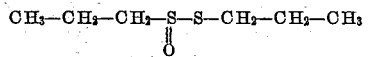

4.50 g. of n-propyl disulfide is dissolved in 200 ml. of acetonitrile and the solution is cooled in an ice-bath. To the chilled solution there is added with stirring during a period of about five minutes a solution of 6.50 g. of percamphoric acid in 100 ml. of acetonitrile. The reaction mixture is allowed to stand at room temperature for about an hour and the acetonitrile is then distilled from the solution at about 20 mm. pressure. The distillation residue is dissolved in chloroform and this solution is washed successively with two 50 ml. portions of a 3% aqueous solution of sodium bicarbonate and a 50 ml. portion of water. The chloroform is distilled from the chloroform solution at about 30–40 mm. pressure. The distillation residue is extracted successively with five 400 ml. portions of water and the combined aqueous extracts are extracted with two 100 ml. portions of chloroform. The chloroform is distilled from the chloroform solution at about 30–40 mm. pressure and the distillation residue is subjected to fractional distillation at low pressure. The fraction which distills from the mixture at 25° C. at 0.007–0.012 mm. pressure consists of n-propyl 1-propanethiolsulfinate. The yield is approximately 3.3 g. The pure compound has a $d_4^{20}$ of 1.045 and $n_D^{20}$ 1.512. It is soluble in water to the extent of about 2%. Analysis calcd. for $C_6H_{14}OS_2$: C, 43.33%; H, 8.49%. Found: C, 43.50%; H, 8.43%.

EXAMPLE 5

*n-Butyl 1-butanethiolsulfinate*

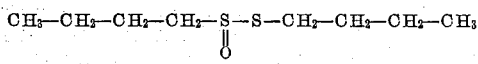

5.0 g. of n-butyl disulfide is dissolved in 300 ml. of chloroform and the solution is cooled in an ice-bath. To the chilled solution there is added with stirring during a period of about five minutes a solution of 3.8 g. of perbenzoic acid in 60 ml. of chloroform. The reaction mixture is allowed to stand at room temperature for about an hour and is then washed successively with two 50 ml. portions of a 3% aqueous solution of sodium bicarbonate and a 50 ml. portion of water. The chloroform is then distilled from the chloroform solution at about 30–40 mm. pressure and the distillation residue is subjected to fractional distillation at low pressure. The fraction which distills from the mixture at 50° C. at about 0.0001 mm. pressure consists of n-butyl 1-butanethiolsulfinate. The yield is approximately 2.7 g. The pure compound has a $d_4^{20}$ of 0.997 and $n_D^{25}$ 1.506. It is soluble in water to the extent of about 0.013%. Analysis calcd. for $C_8H_{18}OS_2$: C, 49.44%; H, 9.34%. Found: C, 49.44%; H, 9.43%.

EXAMPLE 6

*n-Amyl 1-pentanethiolsulfinate*

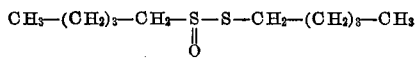

7.0 g. of n-amyl disulfide is dissolved in 1000 ml. of petroleum ether and the solution is cooled in an ice-bath. To the chilled solution there is added with stirring during a period of about five minutes a solution of 4.7 g. of perbenzoic acid in 150 ml. of petroleum ether. The reaction mixture is allowed to stand at room temperature for about an hour and is then washed successively with two 50 ml. portions of a 3% aqueous solution of sodium bicarbonate and a 50 ml. portion of water. The petroleum ether is then distilled from the petroleum ether solution at about 30–40 mm. pressure and the distillation residue is subjected to fractional distillation at low pressure. The fraction which distills from the mixture at 45° C. at $10^{-5}$–$10^{-6}$ mm. pressure consists of n-amyl 1-pentanethiolsulfinate. The yield is approximately 4.26 g. The pure compound has a $d_4^{25}$ of 0.988 and $n_D^{25}$ 1.499. It is soluble to 0.0015% in water. Analysis calcd. for $C_{10}H_{22}OS_2$: C, 54.00%; H, 9.98%. Found: C, 54.03%; H, 9.79%.

EXAMPLE 7

*Tertiary butyl ethanethiolsulfinate*

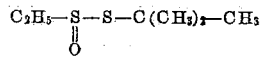

In Example 5, when there is used, instead of the n-butyl disulfide, 4.7 g. of ethyl tertiary butyl disulfide, there is obtained approximately 2.8 g. of tertiary butyl ethanethiolsulfinate, which distills from the reaction mixture at 30° C. at 0.05–0.10 mm. pressure. The pure compound has a $d_4^{25}$ of 1.043 and $n_D^{25}$ 1.509. Analysis calcd. for $C_6H_{14}O_2S$: C, 43.33%; H, 8.49%. Found: C, 43.71%; H, 8.70%.

By employing an oxidation procedure similar to that shown in the above examples, there are obtained 3-pyridineëthyl 2-(beta-pyridyl)-1-ethanethiolsulfinate from bis(3-pyridineëthyl) disulfide; benzyl alpha-toluenethiolsulfinate from benzyl disulfide; beta-carboxyethyl 2-carboxy-1-ethanethiolsulfinate from bis(beta-carboxyethyl) disulfide; alpha, alpha-dimethyl-beta-amino-beta-carboxyethyl ethanethiolsulfinate from ethyl alpha, alpha-dimethyl-beta-amino-beta-carboxyethyl disulfide; cyclohexyl cyclohexanethiolsulfinate from cyclohexyl disulfide; gamma-piperidyl 4-piperidinethiolsulfinate from gamma-piperidyl disulfide; gamma-tetrahydropyranyl 4-tetrahydropyranethiolsulfinate from gamma-tetrahydropyranyl disulfide; phenyl benzenethiolsulfinate from phenyl disulfide; m-carboxyphenyl 3-carboxybenzenethiolsulfinate from bis-(m-carboxyphenyl) disulfide; p-aminophenyl 4-aminobenzenethiolsulfinate from bis(p-aminophenyl) disulfide; 5-nitro-2-pyridyl 5-nitro-2-pyridinethiolsulfinate from bis(5-nitro-2-pyridyl) disulfide; 5-amino-2-pyridyl 5-amino-2-pyridinethiolsulfinate from bis(5-amino-2-pyridyl) disulfide; 4-isoquinolyl 4-isoquinolinethiolsulfinate from 4-isoquinolyl disulfide; gamma-diethylaminopropyl 3-diethylamino-1-propanethiolsulfinate from bis(gamma-diethylaminopropyl) disulfide; 1-oxo-1,2-dithiane from 1,2-dithiane. All of these compounds are antibiotically active.

We claim:
1. The process for preparing an alkyl alkanethiolsulfinate which comprises treating a compound having the formula

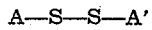

wherein A and A' represent alkyl radicals, with 0.5–2.0 molecular equivalents of an organic per-acid at a temperature below 55° C.
2. The process for preparing an alkyl alkanethiolsulfinate which comprises treating a compound having the formula

wherein A and A' represent alkyl radicals, with an approximately equimolecular quantity of an organic per-acid at a temperature below 55° C. in the presence of an organic solvent.
3. The process for preparing butyl 1-butanethiolsulfinate which comprises treating butyl disulfide with an approximately equimolecular quantity of perbenzoic acid in chloroform solution, at a temperature below 55° C.
4. A compound having the formula

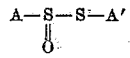

wherein A and A' represent alkyl radicals.
5. Butyl 1-butanethiolsulfinate, having the formula

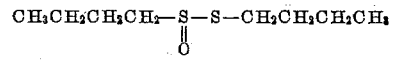

and being characterized by having a $d_4^{20}$ of 0.997 and $n_D^{25}$ 1.506.
6. An organic thiolsulfinate having the formula

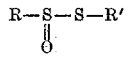

wherein R and R' are hydrocarbon radicals selected from the group consisting of alkyl, aralkyl, and aryl radicals.
7. Ethyl ethanethiolsulfinate, having the formula

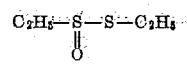

and being characterized by having a $d_4^{25}$ of 1.104 and $n_D^{25}$ 1.524.
8. Amyl 1-pentane thiolsulfinate, having the formula

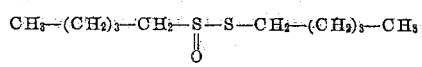

and being characterized by having a $d_4^{25}$ of 0.988 and $n_D^{25}$ 1.499.
9. The process which comprise treating an organic disulfide having the formula

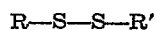

where R and R' are hydrocarbon radicals, with 0.5–2.0 molecular equivalents of an organic per-acid at a temperature below 55° C. and isolating the organic thiolsulfinate thus formed.
10. The process which comprises treating an organic disulfide having the formula

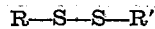

where R and R' are hydrocarbon radicals, with an approximately equimolecular amount of an organic per-acid at a temperature below 55° C. in the presence of an organic solvent, and isolating the organic thiolsulfinate thus formed.

CHESTER J. CAVALLITO.
LA VERNE D. SMALL.

REFERENCES CITED

The following references are of record in the file of this patent:

Vollrath et al.: "Proceedings of Society for Experimental Biology and Medicine," vol. 36, pages 55–58.

Glaser et al.: "Arch. für Exper. Path. und Phar.," vol. 193, 1939, pages 1–9.

Lehmann: "Arch. für Exp. Path. und Phar.," vol. 147, 1930, pages 245–264.